(No Model.)

W. A. WILLIAMSON.
CORKSCREW.

No. 405,385. Patented June 18, 1889.

WITNESSES:
Charles H. Ward
E. T. Ketten

INVENTOR:
W. Alex. Williamson
BY Campbell & Co. ATTY'S.

N. PETERS, Photo-Lithographer, Washington, D. C.

UNITED STATES PATENT OFFICE.

WILLIAM ALEX. WILLIAMSON, OF NEWARK, NEW JERSEY.

CORKSCREW.

SPECIFICATION forming part of Letters Patent No. 405,385, dated June 18, 1889.

Application filed January 12, 1888. Serial No. 260,495. (No model.)

*To all whom it may concern:*

Be it known that I, WILLIAM ALEX. WILLIAMSON, a citizen of the United States, residing at Newark, in the county of Essex and State of New Jersey, have invented certain new and useful Improvements in Corkscrews; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in that class of corkscrews in which the screw is folded into the handle, and which are designed to be carried in the pocket.

The herein-described invention consists of a worm or screw formed from wire and pivotally secured between the ends of the handle, and, furthermore, consists in providing the ends of the handle with abutting posts struck up on said ends and secured together by means of an eyelet or supplemental post, which passes and extends through said posts formed on the ends of the handle, and which is riveted or clinched thereto, the abutting posts on the ends of the handle serving as a bearing, around which is formed the loop or eye on the worm or screw, and which also serve to hold the ends of the handle apart to allow the free and easy movement of the eye formed on the screw around its bearing.

It is obvious that in manufacturing an article of such general and universal use as a corkscrew strength of construction and practicability are important elements, inasmuch as the parts in corkscrews as heretofore made and put together are not of a satisfactory construction when the screw is used where great strain is brought to bear on the parts.

In the present form of corkscrew the handle is formed from a blank, and both ends of the same are provided with hollow posts struck up on one side of the blank, thus causing the same to project inwardly and to abut against each other when the handle is bent in shape, and the ends of the handle and the screw or worm are united or secured together by means of an independent post or rivet passing through the bearing formed by the abutting posts on the ends of the handle and clinched on the outside of the same.

In the accompanying sheet of drawings is illustrated the nature of my improvement, which is designed to make a simple, strong, and a more practical construction than has been made heretofore.

Figure 1:
Figure 2:
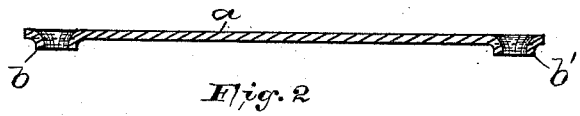
Figure 3:
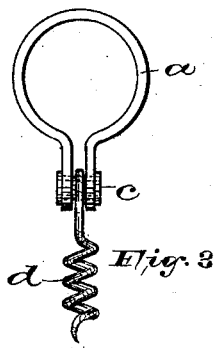
Figure 4:
Figure 5:
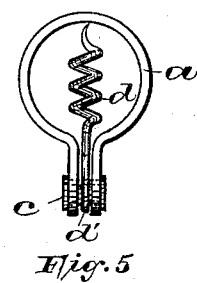
Figure 7:
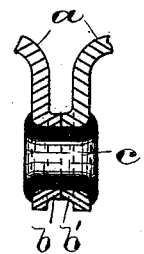
Figure 6:
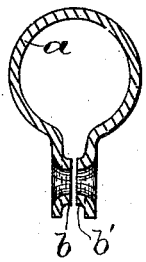
Figure 8:
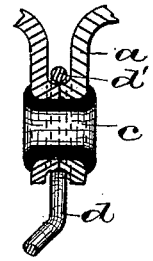

In the several views, Figures 1 and 2 are respectively a plan and a longitudinal section taken centrally through said plan of a struck-up blank from which the handle of the corkscrew illustrated is made. Figs. 3 and 4 are a front and a side elevation, respectively, of the corkscrew in its opened position; and Fig. 5 is a view similar to Fig. 3 of the corkscrew in its closed position. Fig. 6 is a section of the struck-up blank bent into the shape of a handle before the ends thereof are united. Fig. 7 is an enlarged section of the united ends of the handle without the screw attached thereto, and showing the supplemental post or eyelet clinched to the ends of the handle; and Fig. 8 is a view similar to Fig. 7, but showing a portion of the screw attached thereto.

Similar letters of reference indicate corresponding parts in each of the said above-described views.

The improvement illustrated in the above-described views consists in forming the post, by means of which the ends of the handle are kept apart the required distance to permit the easy and free rotation of the eye on the screw encircling the posts, and keeping the same in place, integrally with both of the said ends on one side of the blank, and bending the same, as is illustrated more especially in Fig. 6, and inserting a supplemental post or rivet through the hollow bearing formed by the posts on the ends of the handle and clinching said supplemental post on each side of the ends of the handle.

By the constructions shown in the figures, *b* and *b'* are hollow posts drawn out from the ends of the blank *a* and brought together, as in Fig. 6, thus forming a continuous post or bearing, as is evident. Through the hollow post or bearing thus formed is inserted a supplemental post or rivet *c*, which may be either solid or hollow, as may be desirable, (the hollow rivet, however, being most preferable,) which projects slightly on both sides of the ends of the handle and is clinched thereto, thus firmly uniting the ends together. Between the ends of the handle encircling the united and abutting posts $b\ b'$ is arranged the screw portion or eye $d'$, provided with the worm or screw $d$, as clearly illustrated in Figs. 3, 5, and 8.

From the above description it is apparent that a corkscrew has been attained which is of a very strong construction, the ends of the handle being firmly held together by the eyelet or rivet $c$ employed, substantially as indicated, thus greatly increasing the strength of the posts $b$ and $b'$ and relieving the strain on the clinched ends of the eyelet, and thereby preventing any possibility of the parts from being pulled apart or becoming loose when a great strain is applied to the screw.

By providing the ends of the handle with the abutting posts another great advantage is attained. In the manufacture of the screws as heretofore made it sometimes happens that the ends of the handle are brought too close together by means of the rivet uniting the same, and the eye or loop on the screw becomes firmly wedged within the handle, thus preventing the same from being turned into its open or closed position. In my improved corkscrew this objectionable feature has been avoided by the arrangement of the integral posts on the ends of the handle, which are arranged in such positions in relation to each other that the ends of the posts abut against each other, and thus leave a convenient space between the ends of the handle for the eye on the screw encircling the posts which form a bearing for the same, around which it may rotate without being wedged between the ends of the handle.

Another advantage is that when screwed into a cork in a bottle which fits very tight in the neck of the same, no matter how great a strain is brought to bear on the post, the ends of the handle will always remain the same distance apart, due to the abutting ends on the posts $b$ and $b'$, and thus avoiding all danger of the eye on the screw from being wedged between the ends of the handle.

Having thus described my invention, what I claim is—

A corkscrew consisting of a handle the ends of which are provided with hollow posts formed integrally on said ends, the ends of the posts abutting against each other to form a bearing, an inner or supplemental post or rivet arranged within said bearing formed by the abutting posts on the ends of the handle, and a worm or screw provided with an eye or loop encircling said bearing, for the purposes set forth.

In testimony that I claim the invention set forth above I have hereunto set my hand in the presence of two subscribing witnesses.

W. ALEX. WILLIAMSON.

Witnesses:
FREDK. F. CAMPBELL,
FREDK. C. FRAENTZEL.